Figure 1:
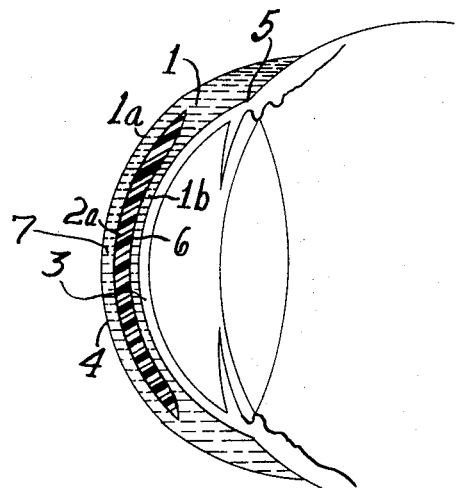

United States Patent [19]
Neefe

[11] 3,710,796
[45] Jan. 16, 1973

[54] CORNEAL DRUG DELIVERY METHOD

[76] Inventor: Charles W. Neefe, Drawer 429, Big Spring, Tex. 79720

[22] Filed: May 14, 1971

[21] Appl. No.: 143,545

Related U.S. Application Data

[63] Continuation-in-part of Ser. No. 45,333, June 11, 1970, which is a continuation-in-part of Ser. No. 562,022, May 16, 1966, abandoned.

[52] U.S. Cl. ................................................128/260
[51] Int. Cl. ..............................................A61m 7/00
[58] Field of Search...............128/260, 261, 249, 172

[56] References Cited

UNITED STATES PATENTS

| 3,626,940 | 12/1971 | Zaffaroni | 128/260 |
| 3,618,604 | 11/1971 | Ness | 128/260 |
| 3,302,646 | 2/1967 | Behney | 128/260 |

*Primary Examiner*—Lawrence W. Trapp

[57] ABSTRACT

An ophthalmic corneal drug delivery method using a flexable hydrophilic dressing to supply beneficial medications to the corneal area.

3 Claims, 2 Drawing Figures

CORNEAL DRUG DELIVERY METHOD

This is a Continuation-in-Part of patent application Ser. No. 45,333, filed June 11, 1970 now pending, which was a Continuation-in-Part of my earlier filed application Ser. No. 562,022, filed May 16, 1966 now abandoned.

Contact lenses that are being used at this time depend upon the flow of lachrymal fluids around the edge of the lens to supply the cornea with its necessary oxygen. The cornea tissue maintains a temperature much lower than the other body tissues. This is due to evaporation at the corneal surface, and the lack of blood supply to the cornea. The absence of corneal blood supply makes the delivery of lasting corneal medications by the usual methods ineffective. The temperature of the cornea must be at this lower level or its metabolic processes will be accelerated. The plastic now being used for fabricating contact lenses a very poor conductor of heat. This insulating material covering a large percent of the corneal area raises its temperature which increases the chemical activity of the metabolic processes and the cornea demands more oxygen. The present lenses preclude the free exchange of atmospheric oxygen dissolved in the precorneal fluid from reaching the corneal tissue. The result is edema and epithelium disorganization.

Lenses have been made with small holes drilled through the lens in an effort to overcome this problem. If the holes are large, they will be seen by the wearer, and if small enough not to be seen, they become clogged with body secretions and are rendered useless.

According to the invention, a contact lens is provided which is made of a transparent permeable material which will respond well to osmosis and thereby remove lachrymal fluid from the inner surface of the lens in contact with the cornea, through the transparent permeable lens, to the outer surface of lens in contact with the atmosphere. It is preferred that at least a portion of the lens have a thickness of no greater than one-thousandth of an inch to thereby respond well to osmosis and unction to remove the surplus fluid from the corneal surface through the transparent permeable lens.

The new and greatly improved contact lens of this invention overcomes these disadvantages by allowing the lachrymal fluids to pass through the material from which the lens is made. The lens is an excellent conductor of heat as it contains water within the lens structure. This water content within the lens material produces a lens which will accept the lachrymal fluids at a very low angle of contact, resulting in a hydrophilic lens and elimination of the necessity of a wetting solution. Present plastics used for contact lenses, on the other hand, are hydrophobic and require a strong wetting agent to render them hydrophilic. Lachrymal fluids and dissolved gases can pass through the lens by diffusion and by osmosis. Evaporation on the anterior surface of the lens creates a higher a salt content in the lachrymal fluid film present on the anterior surface. This increase in salt content lowers the osmotic pressure at the anterior surface and allows the fluids present at the posterior surface to flow through the permeable membrane to the lower osmotic pressure present at the anterior surface. This exchange is slow, but it must be remembered that the metabolic presses of the cornea are slow and this new improved lens is an excellent conductor of heat and the flow of fluid is away from the cornea. This flow away from the cornea is most important for two reasons:

1. the heat is carried away from the cornea by the fluids,
2. the cornea is maintained in a deturgescent state. Excess fluid content within the corneal tissue must be avoided in order to maintain a transparent cornea.

Present corneal contact lenses must be fitted with the peripheral zone flatter than the cornea in order to provide lachrymal flow to the apex of the cornea. This clearance created around the edge allows the lens to move about upon the cornea and may be forced off center by the action of the upper lid. With the present corneal contact lenses, no fixed alignment between the optical center of the contact lens and eye is possible.

If a light absorptive circular disk is placed within the pupil area as described in my U.S. Pat., No, 3,034,403 for a "Contact Lens of Apparent Variable Light Absorption," the disk must remain centered within the pupil area. This new lens is immobile upon the cornea and remains centered in a constant fixed position upon the cornea. This new lens is not dependent upon tear flow around the edges to provide oxygen to the cornea.

This new osmotic permeable lens allows the lachrymal fluids and dissolved gases to pass through the lens material; therefore, the lens may be fitted in true contact with the corneal surface from center to edge. The corneal surface is not spherical therefore no movement of the lens will be possible if the lens is in contact with the cornea from center to edge. This permeable flow differ from passage through holes drilled in the lens in that the atmospheric gases dissolve into the molecular structure of the lens and diffuses into and permeates the lens structure. Evaporation of water at the anterior surface of the lens increases the concentration of salts and organic compounds present in the lachrymal fluid and the cornea is kept deturgescent by osmotic flow through the lens to the higher concentration present at the anterior surface.

This new lens design may be employed as a therapeutic device by adding the required medication to the lens material. The medication will be dissolved slowly by the lachrymal fluids and find its way to the corneal tissue by diffusion to the surface of the lens. With this lens, long-lasting and highly effective medications are new possible. If the medications are placed in the eye while the lens is on the cornea, a part of the medication will find its way to the capillary film present between the lens and cornea and remain effective for an extended period of time. A part of the medication will also be absorbed within the structure of the lens and be released over an extended period of time. This is a great advantage to patients having chronic glaucoma who require continuous medication. Employed as a post-operative dressing, this new lens will insure a smooth corneal surface resulting in greatly improved vision for the patient and lessening the danger of infection.

Figure 2:
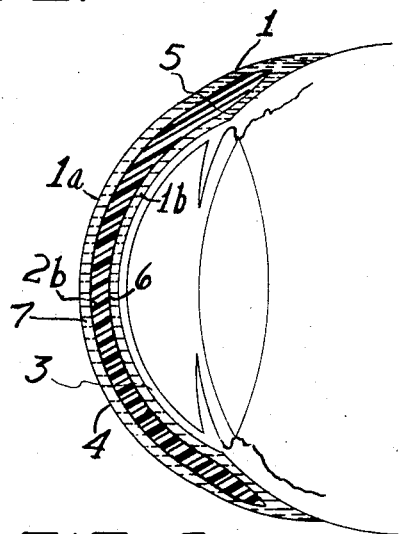

This invention can be more easily understood from a study of the drawings in which:

FIG. 1 is a cross sectional view of an osmotic permeable contact lens of this invention in place on the cornea, having a positive refractive power and being of the size smaller than the cornea; and FIG. 2 is a cross sectional view of an osmotic permeable contact lens of this invention in place of the cornea, and having a positive refractive power and a size larger than the cornea. The larger size makes this lens an excellent post-operative dressing and a drug delivery vehicle. For this purpose, the thickness may be increased to provide an even pressure to all parts of the cornea and provide a greater capacity to hold medications.

It is noted that with exception of lenses 2a and 2b, respectively, the various parts and features having similar functions which are shown in FIGS. 1 and 2, are referred to with the same characters. Lenses 2a and 2b illustrate transparent permeable contact lenses having positive refractive powers. Lens 2b differs from lense 2a in that the outer periphery thereof rests on area 5 (FIG. 2) which is outside the limbus. Lens 2b is useful as a post-operative dressing for corneal surgical cases. Lens 2a is a similar transparent osmotic permeable lens, except it is thinner on its periphery power. In all other respects, the lenses are similar bodies, atmosphere, and a concave inner corneal surface shaped to lie upon and conform to the curvature of the cornea 3. Lachrymal film 1 surrounds the respective lens and covers the surface of the cornea. Film 1a covers anterior surface 4 and film 1b contacts posterior surface 5.

Lens 2a and 2b should be made as thin as possible. The lens of this invention has at least portions thereof which are made much thinner than any conventional contact lens. It has been found that lenses having a minimum thickness in excess of one thousandth of an inch do not respond as well to osmosis as lenses having at least portions thereof with a thickness of no greater than one thousandth of an inch. Thus, it is preferred that regions 7 of lenses 2a and 2b have a thickness of no greater than one thousandth of an inch in order to respond well to the osmosis. This area of maximum thickness will conform to the center sections of minus refractive lenses, and the outer peripheral areas in positive refractive lenses. The size of this area of maximum thickness is generally not critical; however, it is preferred that this area be as large as possible to allow large volumes of fluid to readily pass through the lens by the action of osmosis. Generally, it is preferred that at least 5–10 percent of the area of the lens contain the maximum thickness of no greater than one thousandth of an inch.

The lens of this invention can be made of any suitable transparent osmotic permeable material such as cellulose acetate, for example. The material from which the lens is fabricated must be of a permeable and transparent material. Natural or synthetic materials may be used in their original state, or they may be given chemical treatments to increase their permeability. Soaking for 24 hours at 14° F. in a solution of 30 percent dimethyl ketone, 30 percent ethyl alcohol and 40 percent water has been found to increase the water content and permeability of many organic lens materials. Cellulose acetate can be used in its natural state as it will absorb 5.5 percent water without solvent treatment.

In operation, evaporation takes place on the lachrymal films 1 present on the anterior surface of the lenses 2a and 2b. The evaporation of the water increases the salt content in the lachrymal films 1a covering surfaces 4, thereby lowering the osmotic pressure on the anterior surface of each lens. The salt content of the posterior lachrymal films 1b in contact with surfaces 6 is lower than that of the anterior lachrymal films 14a. Fluids will pass through the permeable membrane lenses 2a and 2b from the low salt content films 1b to the high salt content films 1a. Thus, fluids given off by the cornea will be of lower salt content than that which is present in the anterior films 1a and will pass readily through regions 7 and away from the corner by osmotic action.

The following materials have been found to meet the requirements for a gas permeable hydrophilic contact lens. Diacetone acrylamide, having the following chemical structure,

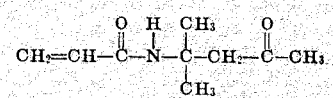

forms homopolymers which are slightly hydrophilic in that the homopolymer will, at high humidities, absorb as much as 25 percent water. These homopolymers also transmit gases at a very high rate as follows:

cc (STP) / 100 sq. in. / 24 hrs. / atm. / mil
$O_2$ = 3,000 cc
$CO_2$ = 3,000 cc This ability to transmit gas is carried to the copolymers of diacetone acrylamide. The following recipes have been found to produce excellent contact lens materials:

| | |
|---|---|
| Diacetome acrylamide | 40% |
| Propylene glycol monomethacrylate | 30% |
| Ethylene glycol monomethacrylate | 30% |

One half to 2 percent of one or combinations of the following catalysts is added to the above mixture:
Azobisisobutyronitrile
Benzoyl peroxide
Methyl ethyl ketone peroxide The solution is purged of free oxygen and polymerization is carried out under a nitrogen atmosphere by heating to 70° C. The reaction is exothermic and water bath cooling is required once polymerization is started.

The above polymer capable of transmitting in excess of 1,000 cubic centimeters of oxygen and carbon dioxide through a 100 square inch area having a thickness of 1 mil and pressure of 1 atmosphere in a 24 period of time.

The cross-linking agent ethyeneglycol dimethacrylate may be added in amounts up to 10 percent to improve the machine ability and structural strength of the finished lens.

Either propylene glycol monomethacrylate or ethylene glycol monomethacrylate may be omitted and volume of the other doubled. The amount of diacetone acrylamide may be increased or may be decreased to no less than 10 percent; a corresponding change in the gas transmission will occure.

The lens is fabricated as follows:
A concave and a convex mold surface are ground and polished on glass or other suitable surfaces. The concave mold surface having a radius equal to the convex surface of the xerogell lens and the convex mold having a radius equal to the concave surface of the xerogell lens.

A silicone rubber spacer is made having a rounded concave inner surface of a shape and thickness corresponding to the shape and thickness of the finished xerogell lens. The lens may new be cast in this mold in the finished state ready to be hydrated. No further reshaping is required.

Various modifications, of course, can be made without departing from the spirit of this invention or the scope of the appended claims. It is understood that many variations are obtainable which will yield contact lens as disclosed herein. The constants set forth in this disclusure are given as examples and are in no way final or binding.

I claim:

1. A method of applying eye medication including the steps of:
   forming a body of soft, liquid permeable plastic material into a contact lens comprising a convex anterior surface and a concave posterior surface;
   impregnating the contact lens with an eye medication material; and
   positioning the contact lens in a human eye with the concave posterior surface thereof positioned adjacent to the cornea of the eye and thereby facilitating vision through the contact lens and simultaneously applying the eye medication in the lens to the eye over an extended period of time.

2. A method of applying medication to the human eye comprising:
   dispersing an eye medication material in the structure of a contact lens formed from a soft, permeable plastic material; and
   positioning the contact lens in the eye of a patient and thereby facilitating vision through the contact lens and simultaneously gradually releasing the eye medication from the contact lens into the eye.

3. A method of applying medication to the human eye comprising:
   impregnating a member formed from a soft, liquid permeable plastic material and having a convex posterior surface with an eye medication;
   positioning the impregnated member in the eye of a patient with the posterior surface of the member substantially engaging the cornea of the eye and thereby gradually releasing the eye medication from the member into the eye.

* * * * *